United States Patent
Liao et al.

(10) Patent No.: US 10,164,804 B1
(45) Date of Patent: Dec. 25, 2018

(54) ADJUSTING A CONTINUOUS TIME LINEAR EQUALIZATION-BASED RECEIVER

(71) Applicant: Intel Corporation, Santa Clara, CA (US)

(72) Inventors: Yu Liao, Longmont, CO (US); Wenyi Jin, San Jose, CA (US); Jihong Ren, Sunnyvale, CA (US)

(73) Assignee: INTEL CORPORATION, Santa Carla, CA (US)

( * ) Notice: Subject to any disclaimer, the term of this patent is extended or adjusted under 35 U.S.C. 154(b) by 0 days.

(21) Appl. No.: 15/629,543

(22) Filed: Jun. 21, 2017

(51) Int. Cl.
*H03H 7/40* (2006.01)
*H04L 25/03* (2006.01)

(52) U.S. Cl.
CPC ............ *H04L 25/03057* (2013.01); *H04L 2025/03503* (2013.01)

(58) Field of Classification Search
CPC ....... H04L 25/03057; H04L 2015/0349; H04L 27/364; H04B 3/04; H04B 3/23
USPC .................. 375/233, 229, 230; 708/322, 323
See application file for complete search history.

(56) References Cited

U.S. PATENT DOCUMENTS

| | | | | |
|---|---|---|---|---|
| 6,751,255 B1* | 6/2004 | Reuven | .............. | H03H 21/0012 375/230 |
| 8,842,767 B2* | 9/2014 | Esmailian | ......... | H04L 25/03146 375/229 |
| 8,867,603 B1* | 10/2014 | Lida | ........................ | H04L 27/01 375/233 |
| 9,438,450 B1* | 9/2016 | Kang | ................ | H04L 25/03885 |
| 9,461,851 B1* | 10/2016 | Liao | ........................ | H04L 27/01 |
| 9,838,072 B1* | 12/2017 | Dai | ........................ | H04B 3/04 |

* cited by examiner

*Primary Examiner* — Khai Tran
(74) *Attorney, Agent, or Firm* — Fletcher Yoder, P.C.

(57) ABSTRACT

Devices and methods for adjusting operation of a receiver that includes a continuous time linear equalizer, a decision feedback equalizer, and a feed forward equalizer. Operation of the receiver may be controlled by determining whether the receiver is operating in operation region using frequency responses of the feed forward equalizer at a first frequency and a second frequency and using the frequency responses of the decision feedback equalizer at the first frequency and the second frequency. If the operation is outside the frequency, a parameter of the continuous time linear equalizer is adjusted based on the frequency responses of the feed forward equalizer and the decision feedback equalizer.

16 Claims, 3 Drawing Sheets

ADJUSTING A CONTINUOUS TIME LINEAR EQUALIZATION-BASED RECEIVER

BACKGROUND

The present disclosure relates generally to receivers. More particularly, the present disclosure relates to continuous time linear equalizers (CTLE) for receivers.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Receivers receive data from transmitters. The data may experience degradation through channels used to transmit the data from the transmitters to the receivers. CTLEs may be used to boost portions of the signal (e.g., mid to high frequency portions) that are more susceptible to loss over a transmission distance through the channels. CTLE adaption is generally based on decision feedback equalizers (DFE) that is inefficient and/or inaccurate due to non-correlation between the DFE and the CTLE resulting from intervening circuitry between the CTLE and the DFE. For example, a feed-forward equalizer may be located between the CTLE and DFE interfering with the correlation between the DFE tap and the CTLE output.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to adjusting operation of a receiver that includes a continuous time linear equalizer, a decision feedback equalizer, and a feed forward equalizer. Operation of the receiver may be controlled by determining whether the receiver is operating in operation region using frequency responses of the feed forward equalizer at a first frequency and a second frequency and using the frequency responses of the decision feedback equalizer at the first frequency and the second frequency. If the operation is outside the frequency, a parameter of the continuous time linear equalizer is adjusted based on the frequency responses of the feed forward equalizer and the decision feedback equalizer.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to analog-to-digital converters (ADC)-based receivers with filtering that includes equalizers. High-speed transmission of signals is particularly vulnerable to channel loss or noise during transmission from a transmitter to a receiver. To clean up the signal at the receiver, a receiver may include equalizers. For example, equalizers may include continuous time linear equalizers (CTLE), decision feedback equalizers (DFE), feed forward equalizers (FFE), and/or other suitable equalizer types. However, when multiple equalizer types are used in the equalization process, the frequency response of the equalization process may be inefficient or improper.

For instance, a CTLE may equalize a received analog signal to a shape by boosting mid-to-high frequency power of the received signal. If a DFE is used along with the CTLE, the CTLE frequency boosting range may be based on DFE tap(s). However, if an FFE is used between the CTLE and the DFE tap(s), the equalizer is not efficient and accurate having poor control over the CTLE frequency boosting range. Due to the FFE, the DFE taps may not correlate well with the frequency response at an CTLE output. Indeed, in some cases, adjusting DFE taps with an intervening CTLE may have little impact on the frequency response of the CTLE.

Instead, when an FFE is used with the CTLE and DFE, an estimate of the CTLE output may be computed by processing the frequency response of the FFE and the DFE rather than the DFE alone. Then, the CTLE frequency boosting is directly adjusted by forcing the frequency response of the CTLE output to a desired range.

Figure 1:
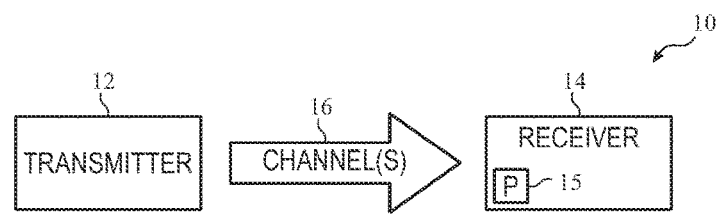
FIG. 1 is a block diagram of a system that utilizes a transmitter and a receiver to communicate data over one or more channels, in accordance with an embodiment.

With the foregoing in mind, FIG. 1 illustrates a block diagram of a system 10 that for transmitting data from a transmitter 12 to a receiver 14. The transmitter 12 and/or the receiver 14 may include a transceiver capable of both transmitting and receiving data. The communication between the transmitter 12 and the receiver 14 occur through one or more channels 16. The integrity of the data deteriorates during transmission through the channel. For example, over a long distance between the transmitter 12 and the receiver 14, the data may lose amplitude of mid-to-high frequency portions of the data. The receiver 14 includes and/or is coupled to a processor 15 that analyzes transmitted data and/or performance of the receiver 14 over the channel 16.

Figure 2:
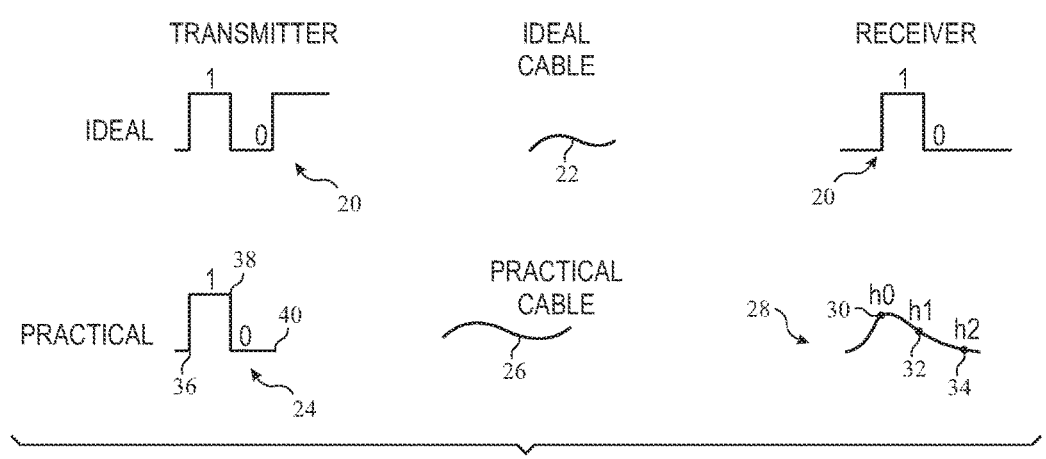
FIG. 2 illustrates the transmission of signals over ideal cables versus practical cables, in accordance with an embodiment.

FIG. 2 illustrates the transmission of signals over ideal cables versus practical cables. As illustrated, a signal 20 is transmitted through a cable 22. Ideally or theoretically, this signal 20 is received at the receiver 14 over the cable 22. However, due to properties of the practical cables (e.g., less cost prohibitive or possible), the signal degrades. Cable performance may also be inhibited by length (e.g., 1 meter) of the practical cable in addition to materials and other factors. During transmission, a transmitted signal 24 is transmitted over a practical cable 26 that degrades the signal from the transmitted signal 24 to the received signal 28. The received signal 28 has experienced attenuation from the transmitted signal 24 to the receiver 14 through the practical cable 26. The received signal 28 includes different levels h0 30, h1 32, and h2 34 attributable to attenuation from the transmitted signal 24. Although these three discrete points are illustrated at a leading edge 36, a falling edge 38, and resting point 40 of the transmitted signal 24, any number of points may be sampled from the received signal 28 regardless of content of the received signal 28 or the transmitted signal 24.

Figure 3:
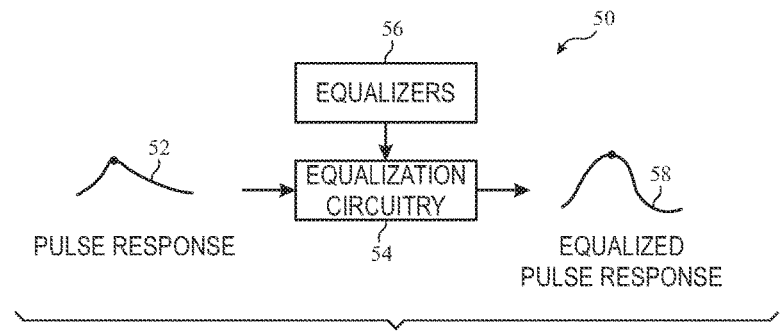
FIG. 3 illustrates a block diagram of an equalization process for equalizing the received signal, in accordance with an embodiment.

Equalizers are used to compensate for the degradation during transmission. FIG. 3 illustrates a block diagram of an equalization process 50 for equalizing the received signal 28. A pulse response 52 is received at the receiver 14. The receiver 14 then submits the pulse response 52 to equalization circuitry 54 that uses one or more equalizers 56 to equalize the pulse response 52 to obtain an equalized pulse response 58.

Figure 4:
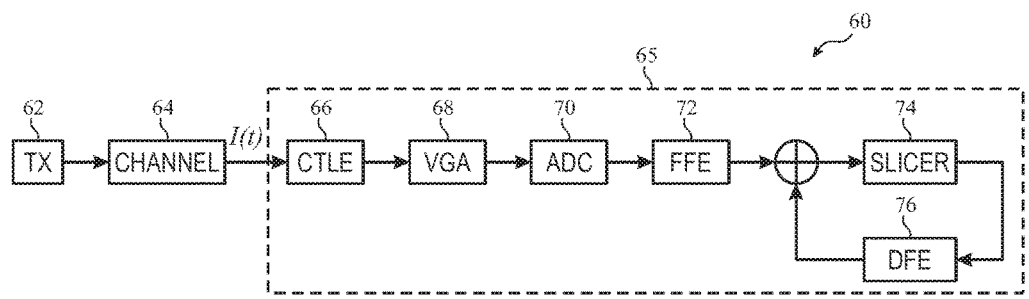
FIG. 4 illustrates a block diagram of a CTLE equalization system in an analog-to-digital (ADC)-based receiver, in accordance with an embodiment.

FIG. 4 illustrates a block diagram of a CTLE equalization system 60 in an analog-to-digital (ADC)-based receiver. A signal is transmitted from a transmitter 62 that sends the signal out over a channel 64 that is received at a receiver 65. The receiver 65 includes a CTLE 66, a variable gain amplifier (VGA) 68, an ADC 70, an FFE 72, a decision slicer 74, a DFE tap 76, and combination circuitry 78 to subtract inter-symbol interference (ISI) from the incoming signal. The CTLE 66 may include a passive or an active CTLE. The CTLE 66 may include resistive-capacitive-based CTLE or an inductance-based CTLE that acts as a mid-to-high-pass transfer function that, along with the VGA 68, boosts the mid-to-high components of the received signal. The CTLE 66 may be used to cancel precursor and long-tail ISI.

An active CTLE 66 may be combined with the VGA 68 to boost the frequency of the mid-to-high frequency power components of the signal. For an active CTLE 66, a tune degeneration resistor and capacitor may be used to move zeroing and a first pole of the CTLE 66. For example, increasing the capacitance of a capacitor in the CTLE 66 moves zero and the first pole to a lower frequency with little change on peaking of the frequency response of the CTLE 66. Similarly, increasing the resistance of a resistor in the CTLE 66 moves zero to a lower frequency while increasing peaking of the frequency response of the CTLE 66 with little change to the first pole.

The receiver 65 also includes an ADC 70 that translates the continuous signal used in the CTLE to a digital signal for use in the non-continuous FFE 72 and the DFE 76. The FFE 72 may include any feed-forward equalizers, such as a finite impulse response (FIR) filter or least mean square (LMS) that filter values without feedback. FFE reduces ISI.

The DFE 76 is a non-linear equalizer that utilizes the decision slicer 74 to quantize input to the slicer 74 as a symbol decision by latching the signal through the slicer 74 at intervals controlled by a clock. The value passed to the DFE 76 from the slicer 74 may be scaled and then combined with (e.g., subtracted) using the combination circuitry 78 to remove the ISI using a feedback loop.

As previously noted, if the CTLE 66 frequency boosting is adjusted based on a DFE tap, the result may inaccurate and/or inefficient since the DFE 76 may not correlate to the frequency response of the CTLE 66 due to the intervening FFE 72. To increase accuracy, the FFE 72 may be taken into account in adjusting the frequency boosting of the CTLE 66.

Figure 5:
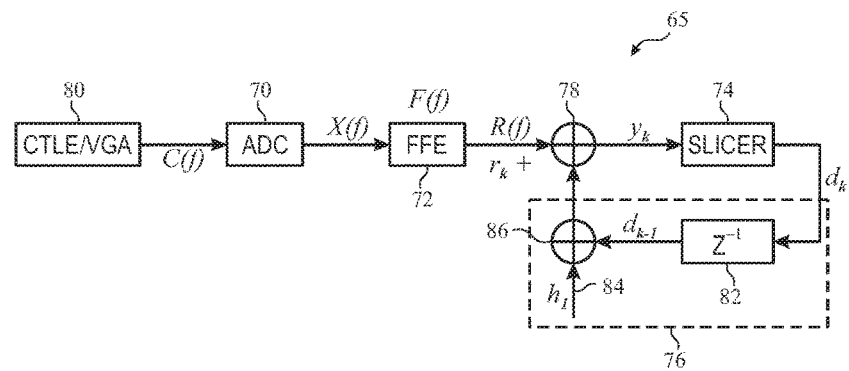
FIG. 5 illustrates an embodiment of the receiver that includes a combination CTLE-variable gain amplifier (VGA), in accordance with an embodiment.

FIG. 5 illustrates an embodiment of the receiver 65 that includes a combination CTLE-VGA 80 that has a frequency response C(f). The illustrated embodiment of the receiver 65 also includes the DFE 76 as FIR filter using a single tap 82. The DFE 76 also includes a scale value 84 taken from the received signal 28 (e.g., h1) that is scaled using multiplier 86 with the value stored in the single tap 82 from the decision slider 74. This scaled value is used to subtract ISI from the input signal.

Figure 6:
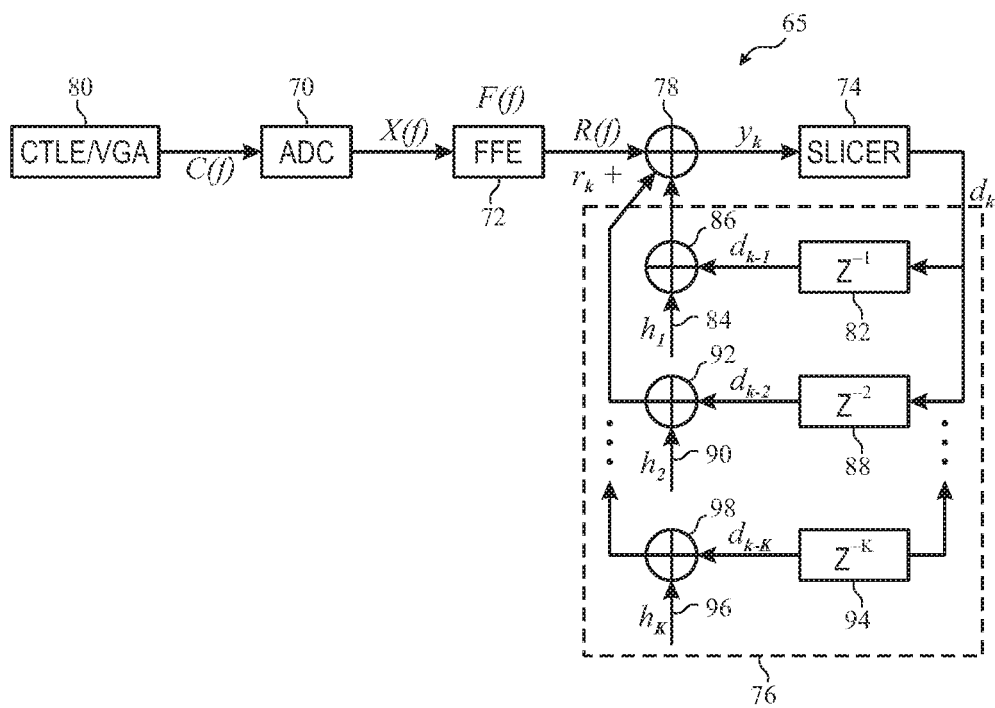
FIG. 6 illustrates an embodiment of the receiver with a decision feedback equalizer (DFE) that utilizes multiple taps, in accordance with an embodiment.

FIG. 6 illustrates an embodiment of the receiver 65 with a DFE 76 that utilizes multiple taps. For instance, a second tap loop includes a second tap 88, a second scaling value 90 taken from the received signal 28 (e.g., h2), and a second multiplier 92 that is scales the value in the second tap 88 using the second scaling value 90. The result of the scaling from the second multiplier 92 is combined with (e.g., subtracted from) the signal using the combination circuitry 78. Any number of tap loops may be included with a final tap loop including a final tap 94, a final scaling value 96 derived from the received signal 28, and a final multiplier 98 used to scale the value in the final tap 94 using the final scaling value 96. The scaled result is then combined with (e.g., subtracted from) the signal using the combination circuitry 78.

As illustrated in FIGS. 5 and 6, the CTLE 66 includes a frequency response C(f). The ADC 70 output has a frequency response X(f) that is approximately equal to C(f) up to the Nyquist frequency. The FFE 72 has a frequency response F(f) and a frequency response R(f) at the output of the FFE 72. $r_k$ is the FFE output sample in time domain, and $y_k$ is the DFE 76 output in time domain. The CTLE 66 may be adapted such that X(f) has a specific shape in a specific range. For example, the shape may be the ratio between Nyquist and DC frequencies $$\left| \frac{X(e^{-j\pi})}{X(e^{-j0})} \right|.$$

The frequency response of the FFE 72 may be described using the following equation:

$$X(f)*F(f)=R(f) \quad \text{(Equation 1)}$$

where X(f) is the frequency response of the ADC 70, F(f) is the frequency response of the FFE 72, and R(f) is the frequency response of the output of the FFE 72. The DC response of these points may be represented by the following equations:

$$X_{dc}=|X(e^{-j0})| \quad \text{(Equation 2)}$$

$$F_{dc}=|X(e^{-j0})| \quad \text{(Equation 3)}$$

$$R_{dc}=|X(e^{-j0})| \quad \text{(Equation 4)}$$

where $X_{dc}$ is the DC response of the ADC 70, $F_{dc}$ is the DC response of the FFE 72, and $R_{dc}$ is the DC response at the output of the FFE 72. Similarly, the Nyquist response of these points may be represented using the following equations:

$$X_{nyq}=|X(e^{-j\pi})| \quad \text{(Equation 5)}$$

$$F_{nyq}=|X(e^{-j\pi})| \quad \text{(Equation 6)}$$

$$R_{nyq}=|X(e^{-j\pi})| \quad \text{(Equation 7)}$$

where $X_{nyq}$ is the DC response of the ADC 70, $F_{nyq}$ is the DC response of the FFE 72, and $R_{nyq}$ is the DC response at the output of the FFE 72. Solving Equation 1 for the DC response of the ADC 70 output results in the following equation:

$$X_{dc} = \frac{R_{dc}}{F_{dc}}. \quad \text{(Equation 7)}$$

Similarly, solving Equation 1 for the Nyquist response of the ADC 70 output results in the following equation:

$$X_{nyq} = \frac{R_{nyq}}{F_{nyq}}. \quad \text{(Equation 8)}$$

Thus, the shape defined by the ratio between the Nyquist frequency and DC may be written using the following equation:

$$\frac{X_{nyq}}{X_{dc}} = \left(\frac{R_{nyq}}{F_{nyq}}\right) \bigg/ \left(\frac{R_{dc}}{F_{dc}}\right) = \left(\frac{R_{nyq} * F_{dc}}{F_{nyq} * R_{dc}}\right). \quad \text{(Equation 9)}$$

Moreover, in the time domain, the output of the FFE 72 may be expressed in terms of the output of the DFE 76 and the scaled taps. Specifically, the output of the FFE 72 may be expressed using the following equation:

$$r_k = y_k + h_1 \cdot d_{k-1} \approx h_0 \cdot d_k + h_1 \cdot d_{k-1} \quad \text{(Equation 10)}.$$

where $h_0$ and $h_1$ are derived from the received signal, $d_k$ is a value to be stored in the DFE tap, $d_{k-1}$ is a previous value stored in the DFE tap, and $y_k$ is the output of the FFE 72 in the time domain. Furthermore, the frequency response of the DFE filter at DC and the Nyquist frequency are approximately the same as the frequency response of the at the output of the FFE 72 for $h_0$ and $h_1$. Moreover, the DC response of the DFE filter may be computed from $1)_0$ and $h_1$ using the following equation:

$$H_{dc}=|h_0+h_1| \quad \text{(Equation 11)}.$$

where $H_{dc}$ is the DC response of the DFE filter. Similarly, the Nyquist response of the DFE 76 may be determined from $h_0$ and $h_1$ using the following equation:

$$H_{nyq}=|h_0-h_1| \quad \text{(Equation 12)}.$$

where $H_{nyq}$ is the Nyquist response of the DFE filter. $F_{dc}$ and $F_{nyq}$ can be calculated from the FFE equalizer taps similar to how $H_{dc}$ is calculated from the DFE filter taps.

Substituting $H_{nyq}$ and $H_{dc}$ into Equations 9 for Rnyq and Rdc, respectively, results in the following equation:

$$\frac{X_{nyq}}{X_{dc}} = \left(\frac{R_{nyq} * F_{dc}}{F_{nyq} * R_{dc}}\right). \quad \text{(Equation 13)}$$

Furthermore, as previously noted, the ratio $$\left(\frac{X_{nyq}}{X_{dc}}\right)$$

of the Nyquist response or the ADC 70 to the DC response of the DC response is in the specific range for the CTLE adaption. Thus, the following inequality may be the target result:

$$\text{th\_low} \leq \frac{X_{nyq}}{X_{dc}} \leq \text{th\_high} \quad \text{(Inequality 1)}$$

where th_low is a lower end threshold of the target range and th_high is the higher end threshold of the target range. Combining Inequality 1 with the Equation 13 results in the following inequalities being inverse conditions of Inequality 1 resulting modifications to cause the CTLE equalization system to return to the conditions of Inequality 1.

$$H_{nyq}*F_{dc}<F_{nyq}*H_{dc}*\text{th\_low} \quad \text{(Inequality 2)}.$$

$$H_{nyq}*F_{dc}<F_{nyq}*H_{dc}*\text{th\_high} \quad \text{(Inequality 3)}.$$

Inequality 2 indicates that the CTLE peaking is too low and is to be increased while Inequality 3 indicated that the CTLE peaking is too high and is to be decreased. Thus, a data set may be used to adapt operation of the CTLE:

If $H_{nyq}*<F_{dc}<F_{nyq}*H_{dc}*\text{th\_low}$, increase CTLE peaking.
If $H_{nyq}*F_{dc}>F_{nyq}*H_{dc}*\text{th\_high}$, decrease CTLE peaking.
Otherwise make no changes to the CTLE settings.

In some embodiments, increases and/or decreases to the CTLE peaking may be made by adjusting components (e.g., resistors) of the CTLE as previously discussed. For example, to increase and/or decrease CTLE peaking a resistance of the CTLE may be adjusted.

Figure 7:
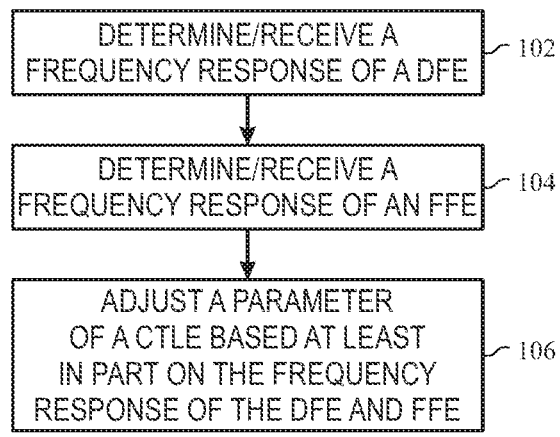
FIG. 7 is a process for deploying the CTLE equalization system of FIG. 1, in accordance with an embodiment.

FIG. 7 is a process 100 for deploying the CTLE equalization system. The processor 15 determines and/or receiver a frequency response of a decision feedback equalizer (DFE) of a filter system (block 102). For example, the processor 15 may use a lookup table based on the receiver 14 and/or the channel, may calculate a response using a known transmission across the channel 16, a determination based on known properties of the DFE. The processor 15 also determines a frequency response of a feed forward equalizer (FFE) (block 104). For example, the processor 15 may use a lookup table based on the receiver 14 and/or the channel, may calculate a response using a known transmission across the channel 16, a determination based on known properties of the DFE.

Based at least in part on the frequency response of the DFE and the FFE, the processor 15 adjusts a parameter (e.g., peaking) of a continuous time linear equalizer (CTLE) (block 106). For example, the CTLE may include an active CTLE that may dynamically adjust peaking, zeroing frequency, and a first pole of the filter by dynamically adjusting capacitances and/or resistances in the CTLE. Furthermore, the CTLE parameter may be adjusted based on the frequency response of one or more frequencies of the DFE and the FFE. For example, the adjustment of the CTLE parameter may be based at least in part responses of the DFE and the FFE at a first frequency (e.g., Nyquist frequency) and a second frequency (e.g., 0 Hz or DC frequency). For instance, the CTLE peaking may be increased when the Nyquist frequency response of the DFE times the DC response of the FFE is less than a Nyquist response of the FFE times the DC response of the DFE times a lower end threshold of a range of operability. Moreover, the CTLE peaking may be decreased when the Nyquist frequency response of the DFE times the DC response of the FFE is greater than a Nyquist response of the FFE times the DC response of the DFE times a higher end threshold of the range of operability.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method for adapting operation of a continuous time linear equalizer system comprising:
   determining a frequency response of a feed forward equalizer;
   determining a frequency response of a decision feedback equalizer; and
   adjusting a parameter of a continuous time linear equalizer based at least in part on a Nyquist response of the decision feedback equalizer, a direct current response of the decision feedback equalizer, a Nyquist response of the feed forward equalizer, a direct current response of the feed forward equalizer, and a threshold of a region of operation of the continuous time linear equalizer.

2. The method of claim 1, wherein the Nyquist response of the feed forward equalizer is at a Nyquist frequency of an analog-to-digital convertor.

3. The method of claim 1, wherein the Nyquist response of the decision feedback equalizer is at a Nyquist frequency of an analog-to-digital convertor.

4. The method of claim 1, wherein adjusting a parameter of the continuous time linear equalizer comprises adjusting a peaking of the continuous time linear equalizer.

5. The method of claim 4, wherein adjusting the peaking of the continuous time linear equalizer comprises increasing or decreasing a resistance of the continuous time linear equalizer.

6. The method of claim 1, wherein adjusting the parameter of a continuous time linear equalizer comprises increasing the parameter when the following is true:

$$H_{nyq}*F_{dc} < F_{nyq}*H_{dc}*th\_low$$

where $H_{nyq}$ is the Nyquist response of the decision feedback equalizer, $H_{dc}$ is the direct current response of the decision feedback equalizer, $F_{nyq}$ is the Nyquist response of the feed forward equalizer, $F_{dc}$ is the direct current response of the feed forward equalizer, and th_low is a lower end threshold of a region of operation of the continuous time linear equalizer.

7. The method of claim 1, wherein adjusting the parameter of a continuous time linear equalizer comprises increasing the parameter when the following is true:

$$H_{nyq}*F_{dc} > F_{nyq}*H_{dc}*th\_high$$

where $H_{nyq}$ is the Nyquist response of the decision feedback equalizer, $H_{dc}$ is the direct current response of the decision feedback equalizer, $F_{nyq}$ is the Nyquist response of the feed forward equalizer, $F_{dc}$ is the direct current response of the feed forward equalizer, and th_high is a higher end threshold of a region of operation of the continuous time linear equalizer.

8. The method of claim 7, wherein the parameter comprises peaking of the continuous time linear equalizer.

9. A receiver comprising:
   a continuous time linear equalizer that receives a signal via a channel;
   a feed forward equalizer that receives the signal from the continuous time linear equalizer and filters out some interference from the signal;
   a decision feedback equalizer that:
      receives the signal from the feed forward equalizer;
      filters the signal; and
      outputs an output signal; and
   a processor that adjusts a parameter of the continuous time linear equalizer based at least in part on a Nyquist response of the decision feedback equalizer, a direct current response of the decision feedback equalizer, a Nyquist response of the feed forward equalizer, a direct current response of the feed forward equalizer, and a threshold of a region of operation of the continuous time linear equalizer.

10. The receiver of claim 9, wherein the Nyquist response of the decision feedback equalizer comprises a response of the decision feedback equalizer at a Nyquist frequency for the receiver.

11. The receiver of claim 10, wherein the Nyquist response of the feed forward equalizer occurs at a Nyquist frequency of the receiver.

12. The receiver of claim 11 comprising an analog-to-digital converter, wherein the Nyquist frequency of the receiver comprises a Nyquist frequency of the analog-to-digital converter.

13. A method for adapting operation of a continuous time linear equalizer system comprising:
   determining whether a continuous time linear equalizer-based receiver is operating in operation region using frequency responses of a feed forward equalizer of the receiver at a first frequency and a second frequency and using frequency responses of a decision feedback equalizer of the receiver at the first frequency and the second frequency; and
   adjusting a parameter of a continuous time linear equalizer of the receiver based at least in part on a Nyquist response of the decision feedback equalizer, a direct current response of the decision feedback equalizer, a Nyquist response of the feed forward equalizer, a direct current response of the feed forward equalizer, and a threshold of a region of operation of the continuous time linear equalizer.

14. The method of claim 13, wherein the parameter comprises peaking of the continuous time linear equalizer.

15. The method of claim 13, wherein adjusting the parameter comprises adjusting a resistance of the continuous time linear equalizer.

16. The method of claim 13, wherein the first frequency comprises a Nyquist frequency of the receiver, and the second frequency comprises 0 Hz.

* * * * *